United States Patent [19]
Matsueda

[11] Patent Number: 5,303,222
[45] Date of Patent: Apr. 12, 1994

[54] OPTICAL RECORD REPRODUCING APPARATUS INCLUDING AUTOMATIC LIGHT AMOUNT CONTROL

[75] Inventor: Akira Matsueda, Hachioji, Japan

[73] Assignee: Olympus Optical Co., Ltd., Tokyo, Japan

[21] Appl. No.: 881,767

[22] Filed: May 12, 1992

[30] Foreign Application Priority Data

May 13, 1991 [JP] Japan .................................. 3-107552

[51] Int. Cl.⁵ .............................................. G11B 7/125
[52] U.S. Cl. .................... 369/116; 369/44.35
[58] Field of Search ............... 369/116, 44.35, 48, 369/44.27

[56] References Cited

U.S. PATENT DOCUMENTS

| | | | |
|---|---|---|---|
| 4,855,988 | 8/1989 | Shinbayashi et al. | 369/116 |
| 5,059,780 | 10/1991 | Kakuta et al. | 369/116 |
| 5,126,993 | 6/1992 | Yokota | 369/116 |
| 5,202,873 | 4/1993 | Ito et al. | 369/48 |

FOREIGN PATENT DOCUMENTS 54-10481  5/1979  Japan .

Primary Examiner—Paul M. Dzierzynski
Assistant Examiner—James Beyer
Attorney, Agent, or Firm—Armstrong, Westerman, Hattori, McLeland & Naughton

[57] ABSTRACT

This optical record reproducing apparatus automatically controls the light amount of a reproducing light source and comprises a switching device switching on/off the control of a reproducing light source driving electric current by an automatic light amount controlling device to prevent the fluctuation of the emitted light amount of the reproducing light source during the operation of reading the data out of an optical recording medium and switching off the control of the reproducing light source driving electric current at least during an operation of reading out the information recorded in the optical recording medium and a holding device holding the light source driving electric current just before switching off the control of the reproducing light source driving electric current by the automatic light amount controlling device by this switching device.

6 Claims, 3 Drawing Sheets

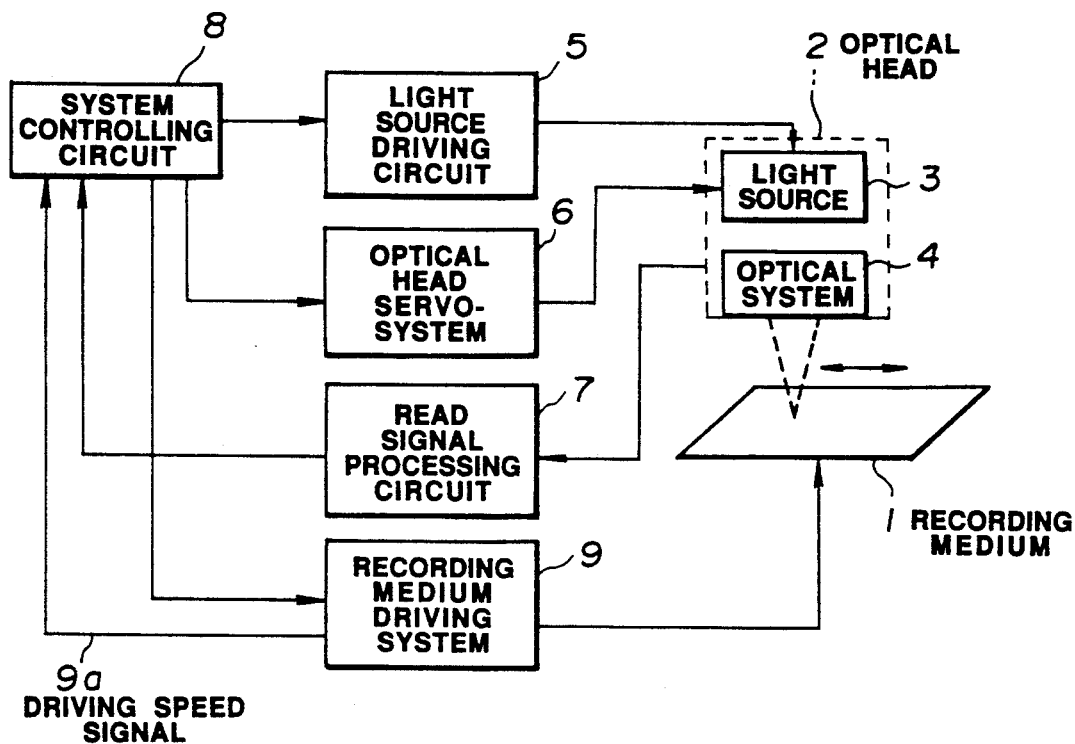
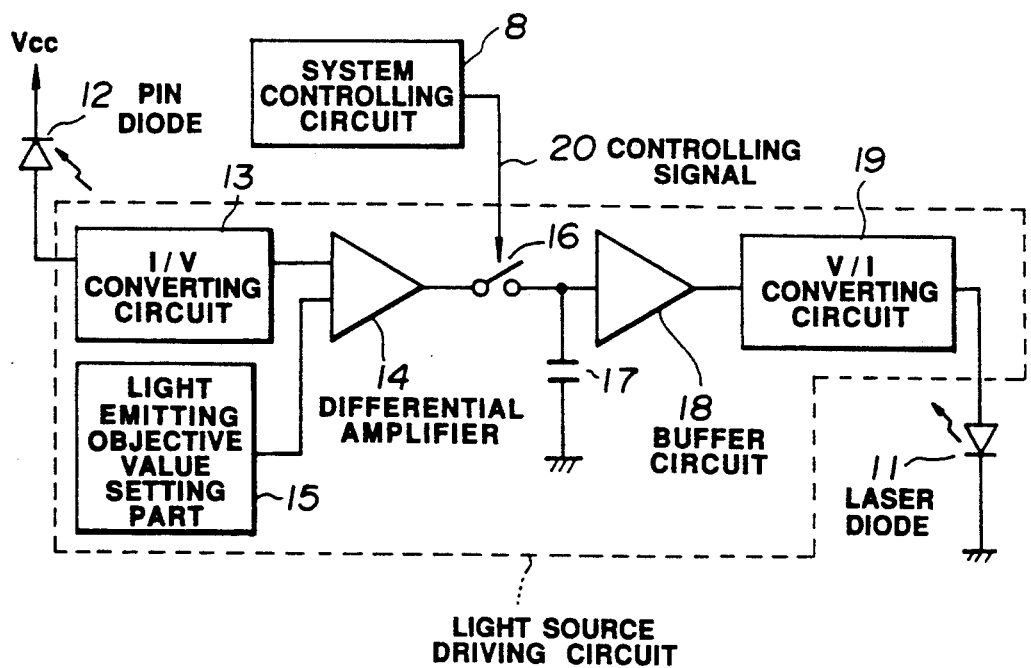

FIG. 3(a)
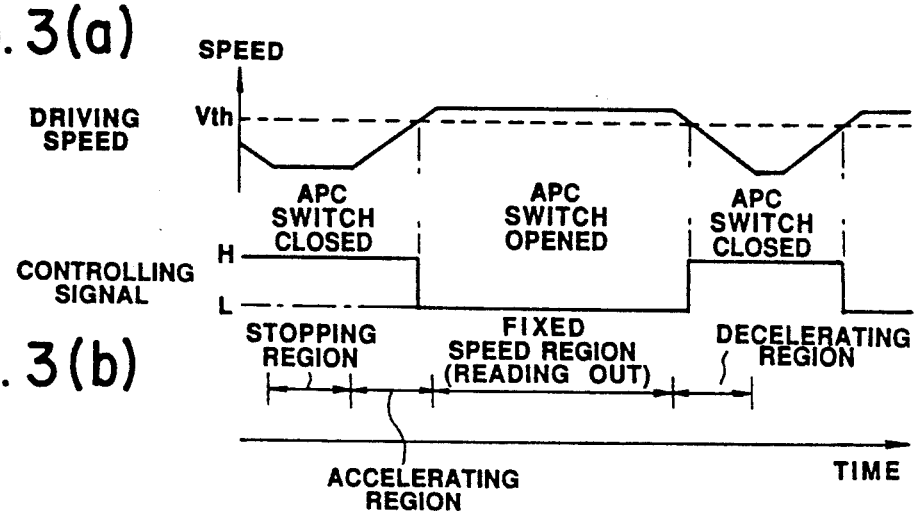
FIG. 3(b)
FIG. 4(a)
FIG. 4(b)
FIG. 4(c)
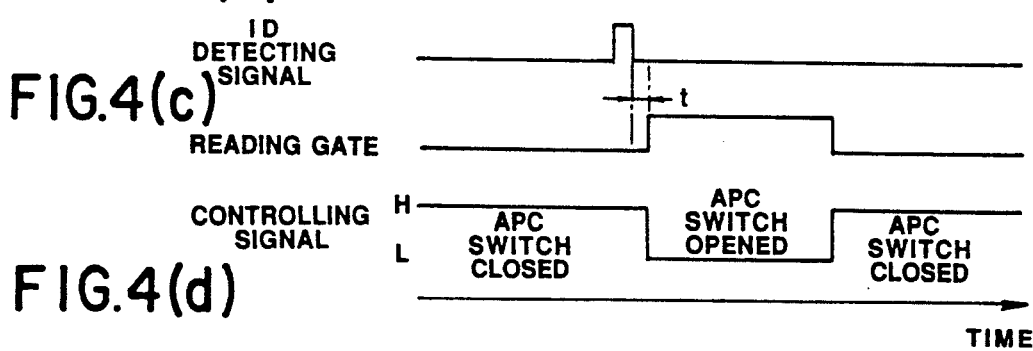
FIG. 4(d)

OPTICAL RECORD REPRODUCING APPARATUS INCLUDING AUTOMATIC LIGHT AMOUNT CONTROL

BACKGROUND OF THE INVENTION

1. Field of the Invention

This invention relates to an optical record reproducing apparatus for automatically controlling the amount of light generated by a reproducing light source, when this light source is driven.

2. Description of the Related Art Statement

Such a light emitting device as an LED or laser diode is often used for a reproducing light source in an optical record reproducing apparatus. The light emitting device is generally high in temperature dependence in each characteristic that, when it is driven at a fixed electric current, the light output easily varies under the influences of the heat generation of the device itself and the ambient temperature. Therefore, as shown in the publication, for example, of Japanese patent, application publication No.10481/1979, the light generated by a reproducing amount of light source of an optical record reproducing apparatus is automatically power controlled so that the light output can be fixed. The automatic power control (abbreviated, as APC hereinafter) is a feedback control wherein the amount of emitted light generated by a reproducing light source is monitored and is compared with a predetermined reference value, so that the light source driving current is adjusted on the basis of the difference between the emitted light amount and the predetermined reference value.

In the optical record reproducing apparatus currently in use making such APC, the following methods are known: (1) a method wherein, during the reading operation, an APC circuit loop is always closed and a feedback is always applied; and (2) a method wherein, during the reading operation, an APC circuit loop is closed at intervals of a fixed time and a feedback is intermittently controlled.

When such APC is made, if a difference is produced between the emitted light amount of the reproducing light source and a reference objective value to be a reference value, the light source driving current is controlled to follow the objective value in response to this difference and the emitted light amount is kept fixed.

However, in a case in which the APC described above is made, the emitted light amount of the reproducing light source fluctuates during the period after the APC starts the operation until it converges to the objective value. Therefore, in the optical record reproducing apparatus currently in use, the fluctuation of the emitted light amount is generated during the reading operation. That is to say, in the course of following the objective value, the emitted light amount of the reproducing light source fluctuates by application of the APC and, therefore, during the reading operation, a difference is produced between the objective value and the light source emitted light amount, or the emitted light amount fluctuates at regular intervals. It has been a problem that a defect such as a reading error is caused by the fluctuation of the emitted light amount.

SUMMARY OF THE INVENTION

An object of this invention is to provide an optical record reproducing apparatus for automatic power controlling a reproducing light source wherein, during the data reading operation, the APC (automatic power control) is halted so that the fluctuation of the emitted light amount of the reproducing light source accompanying the APC can be prevented and the generation of a defect such as a reading error can be eliminated.

Another object of this invention is to provide an optical record reproducing apparatus for automatically power-controlling a reproducing light source wherein, when the APC is stopped, the drive of the reproducing light source can be held at that of an emitted light amount just before the APC is stopped to prevent the fluctuation of the emitted light amount of the reproducing light source accompanying the APC.

Further, another object of this invention is to provide an optical record reproducing apparatus wherein, when the driving speed of a recording medium is at a predetermined speed and below, a reproducing light source is automatically power-controlled but, when the driving speed of the above mentioned recording medium is at least the predetermined speed or over, or a fixed speed, the amount of above mentioned APC is halted so that the fluctuation of the emitted light, generated by the reproducing light source accompanying the APC can be prevented and the generation of a defect such as a reading error can be eliminated.

Further, another object of this invention is to provide an optical record reproducing apparatus for automatically power-controlling a reproducing light source wherein, when a reading gate for reading out data is active, the APC is halted so that the generation of a defect such as a reading error can be eliminated.

Further, another object of this invention is to provide an optical record reproducing apparatus for automatically power-controlling a reproducing light source wherein, when the driving speed of a recording medium is an a fixed speed region and a stopping region, the APC is halted so that the fluctuation of the amount of emitted light generated by the above mentioned light source accompanying the APC can be prevented so that a reading error and a recording error in the recording medium can be prevented.

An optical record reproducing apparatus in the present invention comprises an optical head having a light source provided with a light emitting device generating at least a reproducing light beam and condensing the above mentioned reproducing light beam on an optical recording medium on which information is optically recorded in order to read out the information; a recording medium driving means driving the above mentioned recording medium and relatively moving the recording medium to the above mentioned reproducing light beam; an automatic light amount controlling means monitoring the emitted light amount of the light source generating the above mentioned reproducing light beam and controlling the above mentioned light source driving electric current so that a predetermined light amount can be obtained; a switching means for switching on/off the control of the above mentioned light source driving electric current by the above mentioned automatic light amount controlling means, switching off the control of the above mentioned light source driving electric current at least during the operation of reading out the information recorded in the above mentioned optical recording medium; and a holding means holding the light source driving electric current to the level just before switching off the control of the light source driving electric current by the above mentioned automatic light amount controlling means by the above mentioned switching means.

The other features and advantages of this invention will become apparent enough from the following explanation.

BRIEF DESCRIPTION OF THE DRAWINGS

FIGS. 1 to 3 relate to the first embodiment of the present invention.

FIG. 1 is a block diagram showing a schematic formation of an optical record reproducing apparatus.

FIG. 2 is a formation explaining diagram showing the formation of a light source and light source driving circuit.

FIG. 3(a-b) is a timing chart showing the relation between a recording medium driving speed and APC operation.

FIG. 4(a-d) is a timing chart showing the relation between the recording medium driving speed and APC operation in the second embodiment of the present invention.

DETAILED DESCRIPTION OF THE PREFERRED EMBODIMENTS

Figures 5A, 5B:
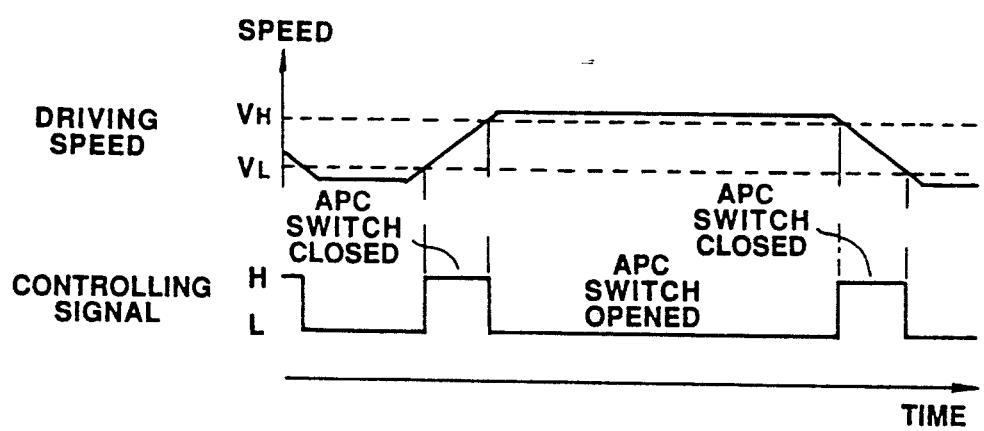
FIG. 5(a-b) is a timing chart showing the relation between the recording medium driving speed and APC operation in the third embodiment of the present invention.

As shown in FIG. 1, an optical record reproducing apparatus is provided with an optical head 2 radiating a light beam onto a recording medium 1 to record and reproduce information. Here, only the reproduction of the recorded information shall be explained. The above mentioned optical head 2 is provided with a light source 3 having a laser diode, an optical system 4 emitting an emitted light from this light source 3 as a light beam and an actuator, not illustrated, driving this optical system 4 and others to deflect the light beam and control the focus. The above mentioned light source 3 is connected to a light source driving circuit 5 by which a driving current flowing through the laser diode is controlled to generate a reading light beam.

The above mentioned optical head 2 is connected to an optical head servo-system 6 controlling the actuator so that the light beam can correctly trace the recording medium 1 with a detected signal from the optical head 2 and a read signal processing circuit 7 processing the read signal detected by the optical head 2 to be converted to digital data. The above mentioned light source driving circuit 5, optical head servo-system 6 and read signal processing circuit 7 are connected to a system controlling circuit 8 by which such control of the entire apparatus as the control of driving the light source and of tracking and focusing the light beam, and the demodulation of the read data are made. The light source driving part is formed of the above mentioned light source driving circuit 5 and system controlling circuit 8. The system controlling circuit 8 is connected also to a recording medium driving system 9 as a recording medium driving means holding and reciprocating the recording medium 1. This recording medium driving system 9 supplies a driving speed signal 9a showing a medium driving speed in the case of driving the recording medium 1 to the system controlling circuit 8. As this driving speed signal 9a, for example, the speed detected from the output of an encoder fitted to the driving shaft of a motor is used.

The above mentioned light source 3 and light source driving circuit 5 are formed as shown in FIG. 2. The light source 3 has a laser diode 11 emitting a laser light and a PIN diode 12 receiving a part of the light of this laser diode 11 and outputting a current (emitted light amount monitor current) in response to the emitted light amount of the laser diode 11. The light source driving circuit 5 is provided with an I/V converting circuit 13, differential amplifier 14, light emitting objective value setting part 15, APC switch 16, voltage holding condenser 17, buffer circuit 18 and V/I converting circuit 19.

The I/V converting circuit 13 converts the above mentioned emitted light amount monitor current from the PIN diode 12 to a voltage and feeds it to the differential amplifier 14 at one input end. A voltage corresponding to the objective value is fed from the light emitting objective value setting part 15 to the differential amplifier 14 at the other input end. This light emitting objective value setting part 15 is a controlling objective value setting part of a feedback circuit making an APC. A voltage corresponding to the objective value is obtained by dividing the reference voltage, for example, in a variable resistance. The differential amplifier 14 compares the output values of the I/V converting circuit 13 and the light emitting objective value setting part 15 and outputs the difference voltage. The APC switch 16 is an analogue switch switched on/off by a controlling signal 20 from the system controlling circuit 8. Thereby, the APC feedback loop can be opened and closed. The voltage holding condenser 17 holds the difference voltage just before the APC feedback loop is opened by the APC switch 16 so that a fixed driving current can flow through the laser diode 11. The buffer circuit 18 is a buffer circuit of a gain 1 and has a high input impedance so that the held voltage of the voltage holding condenser 17 is not varied by the leakage of the electric charge. This buffer circuit 18 is formed of an operating amplifier, for example, of an FET input. The V/I converting circuit 19 voltage-current converts the output of the buffer circuit 18 and drives the laser diode 11. An APC part is formed of the I/V converting circuit 13, light emitting objective value setting part 15, differential amplifier 14, buffer circuit 18 and V/I converting circuit 19 in the above mentioned light source driving circuit 5 except the APC switch 16 and voltage holding condenser 17.

The operation of the optical record reproducing apparatus of this embodiment shall be explained in the following.

In the above mentioned light source driving circuit 5, the emitted light amount of the laser diode 11 is detected by the PIN diode 12 and is compared with an objective value. Then, a feedback is applied so as to make a difference between the amount of emitted light and the objective value approach zero. Here, the APC is performed by opening and closing the APC feedback loop with the APC switch 16 or the state just before the feedback loop is opened is held by stopping the APC. FIG. 3 shows the relation between the recording medium driving speed and the APC operation. (a) represents a driving speed of the recording medium 1 and (b) represents the controlling signal 20 fed to the APC switch 16.

When the recording medium 1 becomes a predetermined speed Vth or below, the controlling signal 20 rises to be a high level (abbreviated as "H" hereinafter) and then, the APC switch 16 is closed. Thereby, the APC feedback loop is closed, so that the APC is made and the emitted light amount of the laser diode 11 is adjusted. In a record reproducing apparatus using an optical card, data are read out usually at a fixed speed and an acceleration/deceleration is carried out in the parts where there are no data at both ends of the track to avoid a synchronous error in a system of modulating such self-clock as an MFM. Therefore, in the recording medium accelerating and decelerating regions and stopping region in which data are not read out, the controlling signal 20 becomes "H" and an APC is made. In the fixed speed region in which data are read out, the controlling signal 20 falls to a low level (abbreviated as "L" hereinafter), the APC is stopped and the laser diode 11 driving current is held in the state just before. Also, in the recording medium driving system 9, a signal showing whether or not it is the fixed speed Vth and below can be produced as a driving speed signal 9a and fed to the system controlling circuit 8.

Data are reproduced as in the following. When the recording medium 1 stops, the controlling signal 20 is "H" and an APC operation is made by the light source driving circuit 5. The system controlling circuit 8 instructs the recording medium driving system 9 to drive the recording medium 1. The recording medium driving system 9 drives the recording medium 1 as shown in FIG. 3 (a). When the recording medium 1 driving speed becomes Vth and over and shifts into the fixed speed region and the light beam from the optical head 2 enters the data region of the recording medium 1, the controlling signal 20 becomes "L". Then, the APC is stopped and the state just before stopping is held. In this state, the reading light beam from the optical head 2 scans the data pits of the recording medium 1. After the read signal detected by the optical head 2 is processed by the read signal processing circuit 7 to be converted to digital data, the data are fed to the system controlling circuit 8. Meanwhile, the light beam is controlled by the optical head servo-system 6 so as to follow any desired track. Then, the data are demodulated by the system controlling circuit 8 to complete the reproduction of the data. When the reading operation ends, the system controlling circuit 8 instructs the recording medium driving system 9 to stop the recording medium 1. Here, when the driving speed of the recording medium 1 becomes the predetermined speed Vth and below, the controlling signal 20 becomes "H" and the APC operation starts again.

As in the above, it is possible that the APC is operated by closing the APC feedback loop only in a case in which the recording medium driving speed is the fixed speed and less, and that the APC is not operated when no reading out is made. Then, it is possible that the laser diode driving current is not varied by the APC while the data are being read out. Therefore, the amount of fluctuation of the emitted light of the light source during the data reading operation can be prevented and the generation of a reading error can be prevented.

In the above described example, the data are read out by always driving the recording medium 1 at a fixed speed in the data regions of each track. However, in some case of seeking a desired track, only the ID regions provided in a part of the tracks are read out and the light beam is moved to the next track. In such case, in order to reduce the access time, the recording medium drive may be stopped or turned of even in the data region. In this embodiment, in a case in which the reading light beam from the optical head 2 becomes the predetermined speed or below even in the data region, the APC is operated. That is to say, even if the light beam is in the data region, when the data are not read out, the APC is made. Thus, when the data are not read out, the APC is made and, only during the reading operation, the APC is not made so that the fluctuation of the emitted light amount of the light source can be prevented.

FIG. 4 shows the second embodiment of the present invention.

In the second embodiment, when the data are actually being read out, the APC is stopped so that the fluctuation of the emitted light amount of the light source can be prevented. The formation of the apparatus is the same as of the first embodiment shown in FIG. 1. FIG. 4 shows the relation between the recording medium driving speed and the APC operation. (a) represents a driving speed of the recording medium 1, (b) represents an ID detecting signal showing that an ID of a track/sector is detected out of a read signal, (c) represents a reading gate for reading out data and (d) represents the controlling signal 20 fed to the APC switch 16.

When the recording medium 1 stops, the controlling signal 20 is "H" and an APC operation is made by the light source driving circuit 5. The system controlling circuit 8 instructs the recording medium driving system 9 to drive the recording medium 1. The recording medium driving system 9 drives the recording medium 1, as shown in FIG. 4 (a). When the driving speed of the recording medium 1 becomes a fixed speed and an ID of a track/sector is detected, an ID detecting signal is output. After the ID detecting signal is output and a time t elapses, the reading gate for reading out data opens and the data is read out. Simultaneously with it, the controlling signal 20 becomes, "L", and then, the APC is stopped. Thereby, the state just before stoppage of the APC is held. When the reading operation ends, the system controlling circuit 8 closes the reading gate and makes the controlling signal 20 "H", and then, the APC operation starts again.

As in the above, when the reading gate for actually reading out data is open, the APC operation is halted. Thus, during the reading operation, the APC operation is not performed, and while the data are being read out, the laser diode driving current is not varied by the APC. Thereby, during the data reading operation, the fluctuation of the emitted light amount of the light source can be prevented and the generation of a reading error can be prevented.

As a modification of the second embodiment, irrespective of the recording medium driving speed (for example, even in the case in which the recording medium driving speed is always a fixed speed), only when the reading gate for actually reading out data is open, the controlling signal 20 is "L", and then, the APC can be stopped so as to hold the state just before. Thereby, during the data reading operation, the APC is not operated, so that the fluctuation of the emitted light amount of the light source and the generation of a reading error can be prevented.

Also, in the second embodiment, although the APC operation is conducted at the ID detecting time point, it is possible to stop the APC operation at this time point. For this purpose, for example, it can be detected that the driving speed of the recording medium 1 becomes a fixed speed and the read gate is opened, and then, the read gate is made closed when a predetermined amount of data in the ID and one track is read. Thus, the controlling signal can be also switched in conformity with this gate opening and closing timing.

FIG. 5 shows the third embodiment of this invention. In this embodiment, the formation of the apparatus is also the same as in FIG. 1.

In the first embodiment, if the recording medium driving speed is below a predetermined speed or, even when the recording medium stops, an APC operation is made. However, in the case of a recordable medium, when the recording medium stops, the sensitivity of the recording medium is so high due to the relation between the characteristic of the recording medium and the emitted light amount of the reading light beam that, if the APC is made at this time, the recording will be likely to be caused in the medium by the fluctuation of the emitted light amount of the light source by the APC. Therefore, in the third embodiment, as shown in FIG. 5, two speeds of VH and VL are set so that, in the case in which the recording medium driving speed is less than VH and greater than VL, the APC is made and, in the case in which it is greater than VH or less than VL, that is, in the fixed speed region, and stopping region, the APC is stopped to hold the state just before stoppage of the APC.

When the recording medium 1 stops, the controlling signal 20 is "L" and the APC stops. The system controlling circuit 8 instructs the recording medium driving system 9 to drive the recording medium 1. Then, the recording medium 1 is driven. When the driving speed of the recording medium 1 becomes VL and over (when in the accelerating region), the controlling signal 20 becomes "H" and the APC operation is made by the light source driving circuit 5. Further, when the driving speed rises to be VH or more, the controlling signal 20 becomes "L". Then, the APC is stopped and the driving current is held in the state just before. In this state, the data reading operation is conducted. When the reading operation ends, the system controlling circuit 8 instructs the recording medium driving system 9 to stop the recording medium 1. Here, when the driving speed of the recording medium 1 becomes VH and less (when in the decelerating region), the controlling signal 20 becomes "H" and the APC operation starts again. When the driving speed further reduces to be VL and less the recording medium 1 stops, the controlling signal 20 becomes "L" and the APC is stopped again and the state just before is held.

As in the above, only when the recording medium driving speed varies, that is only in the accelerating region or decelerating region, is the APC operated. When the recording medium is at a fixed, speed or stopped, the APC is stopped and the state just before stoppage of the APC is held, so that the fluctuation of the emitted light amount of the light source during the data reading operation can be prevented and that the generation of a reading error can be eliminated and that the mis-recording in the medium by the fluctuation of the emitted light amount of the light source when the recording medium stops can be prevented.

Also, when the value just before stoppage of the APC is held, whether or not the value just before stoppage is within a predetermined range representing a normal light emitting range is judged. In the case in which it is outside this predetermined range, the value just before stoppage is not held and the operation can be suspended as an abnormal light emission.

In this embodiment, the light source driving means having the analog type APC circuit is used; however, a light source driving means having a digital type APC function by a hardware or CPU can be used.

In this invention, it is apparent that working modes different in a wide range can be formed on the basis of this invention without departing from the spirit and scope of the invention. This invention is not restricted by its specific working modes except that it is limited by the appended claims.

What is claimed is:

1. An optical record reproducing apparatus comprising:
   an optical head having a light source provided with a light emitting device for generating a reproducing light beam, said optical head condensing said reproducing light beam on an optical recording medium on which information is optically recorded to read out the information;
   a recording medium driving means for driving said recording medium and moving said reproducing medium to said reproducing light beam;
   an automatic light amount controlling means for monitoring the amount of light emitted from the light source generating said reproducing light beam and controlling a light source driving electric current so that a predetermined light amount can be obtained;
   a switching means for providing switching on/off control of said light source driving electric current by said automatic light amount controlling means, said switching means switching off the control of said light source driving electric current at least during an operation of reading out the information recorded in said optical recording medium; and
   a holding means holding the light source driving electric current just before switching off the control of the light source driving electric current by said automatic light amount controlling means by said switching means.

2. An optical record reproducing apparatus according to claim 1, wherein said switching means switches on the control of the light source driving electric current by said automatic light amount controlling means when an optical recording medium driving speed produced by said recording medium driving means is reduced to be less than a predetermined speed and switches off the control of said light source driving electric current when said optical recording medium driving speed is increased to be greater than the predetermined speed.

3. An optical record reproducing apparats according to claim 1, wherein said switching means switches off the control of the light source driving electric current by said automatic light amount controlling means only during the operation of reading out data of the optical recording medium.

4. An optical record reproducing apparatus according to claim 1 wherein said switching means switches off the control of the light source driving electric current by said automatic light amount controlling means when a reading gate for reading out data of the optical recording medium is opened.

5. An optical record reproducing apparatus according to claim 1, wherein said switching means switches off the control of the light source driving electric current by said automatic light amount controlling means where an optical recording medium driving speed produced by said recording medium driving means is in one of a fixed speed region when data is being read out of the optical recording medium, and a stopping region when data is not being read out of the optical recording medium.

6. An optical record reproducing apparatus according to claim 1 wherein said automatic light amount controlling means monitors the emitted light amount of the light source generating said reproducing light beam, compares said emitted light amount with a predetermined reference value and controls the light source driving electric current based on a difference between said emitted light amount and said predetermined reference value.

* * * * *